March 21, 1939.  E. W. BREISCH  2,151,650
POST SEALING DEVICE FOR STORAGE BATTERY CELLS
Filed Aug. 29, 1934
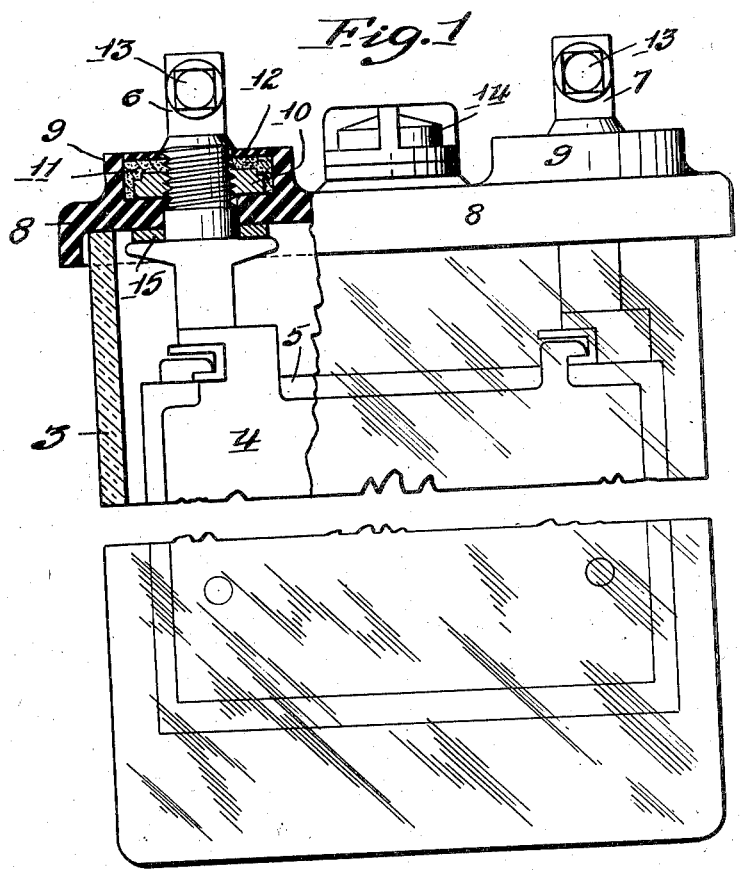
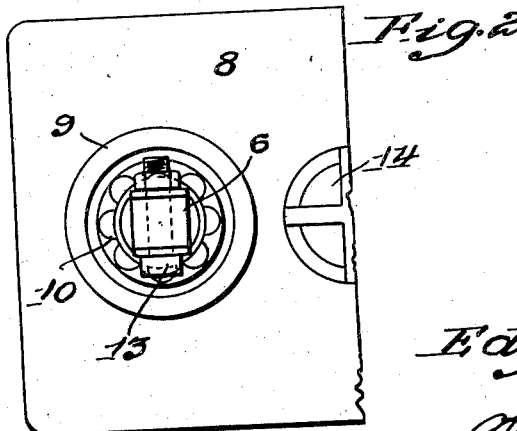
Inventor
Edgar W. Breisch
By Stryker & Stryker
Attorneys Patented Mar. 21, 1939

2,151,650

UNITED STATES PATENT OFFICE 2,151,650

POST SEALING DEVICE FOR STORAGE BATTERY CELLS

Edgar W. Breisch, Lancaster, N. Y., assignor to National Battery Company, St. Paul, Minn., a corporation of Delaware Application August 29, 1934, Serial No. 741,894

1 Claim. (Cl. 136—168)

As is well known in this art, the electrolyte of storage batteries has a tendency to follow up the terminals or posts and to escape gradually at the top of the battery. This occurs even where gaskets are employed at the junction of the posts and battery cover and such gaskets are held under compression by the use of nuts threaded on the posts.

It is the object of this invention to guard against such escape of electrolyte by providing means for efficiently sealing the connections between the battery posts and cover.

Other objects will appear and be more fully pointed out in the following specification and claim.

Referring to the drawing:

Figure 1 is a part side elevation and part central vertical section, illustrating my invention as embodied in one type of battery cell.

Fig. 2 is a fragmentary plan view of the device with the sealing composition and closure for the composition recess removed.

The cell illustrated is of the stationary type having a glass jar or container 3 for the electrolyte and plates 4 of the usual or suitable type with separators 5 between them. The unit, comprising the plates and separators, is suspended in the container 3 from posts 6 and 7 which are secured to a battery cover 8. The cover 8 is perforated to receive the posts 6 and 7 and is formed around each post with an annular flange 9. These flanges 9 constitute receptacles for nuts 10 which are threaded on the posts 6 and 7 respectively. Above and at the outer peripheries of the nuts 10 is a normally semi-solid sealing composition 11. This sealing composition is preferably a mineral grease, such as petrolatum, of such viscosity as to remain in place and having the characteristic of repelling the electrolyte. It is necessary that the sealing composition be stable in the presence of the electrolyte and of such nature that it will not attack the rubber or other composition constituting the cover of the battery.

The sealing composition fills the recess at the outer periphery of the nut and at the top of the same so that the connections between the nut and post and also between the nut and cover 8 are sealed. I prefer to place a small closure disk 12 at the top of the sealing composition and within the upper rim of the flange 9. A pair of the disks 12 may be employed to indicate the polarity of the battery, the disk at the positive post being colored red and that at the negative post white or black, in accordance with the common method of designating polarity. The posts have suitable means for making the connections with circuit wires, such means in the illustrated embodiment being the bolts 13, and the cover 8 is provided with a filling opening and cap 14 of common type. A rubber gasket 15 may be placed around each of the posts to further seal the connection at the bottom surface of the cover 8, as illustrated in Fig. 1. Such gaskets guard against the escape of the sealing grease into the battery container in the event that the battery is subjected to such high temperatures as to liquefy the grease. When a sealing composition having a sufficiently high melting point is employed, the gaskets are not considered essential to the efficient sealing of the connections between the posts and cover.

Having described my invention, what I claim as new and desire to protect by Letters Patent is:

A sealing device for a post of a storage battery comprising, a cover perforated to receive said post and formed with an annular recess in its upper surface adjacent to said perforation, said post being threaded and projecting through and above said perforation and recess, a nut for confining said cover on the post and battery threaded on said post in said recess and engaging said cover at the bottom of said recess only, a semisolid grease in said recess above and at the outer periphery of said nut, a closure for the top of said recess and means for sealing the connection between said post and the bottom surface of said cover adapted to be held under compression by said nut.

EDGAR W. BREISCH.